United States Patent [19]

Sawada

[11] 3,751,044

[45] Aug. 7, 1973

[54] TURNTABLE SUPPORT FOR A RECORD PLAYER

[75] Inventor: Takehiko Sawada, Fukui-shi, Japan

[73] Assignee: Matsushita Electric Industrial Co., Ltd., Kadoma, Osaka, Japan

[22] Filed: Sept. 11, 1970

[21] Appl. No.: 71,315

Related U.S. Application Data

[63] Continuation-in-part of Ser. No. 768,830, Oct. 18, 1968, abandoned.

[30] Foreign Application Priority Data

Oct. 24, 1967 Japan ........................... 42/69129

[52] U.S. Cl. ................................ 274/39 A, 308/9

[51] Int. Cl. ........................................ G11b 3/60

[58] Field of Search ....................... 274/39 R, 39 A; 308/9

[56] References Cited

UNITED STATES PATENTS

| | | | |
|---|---|---|---|
| 3,103,364 | 9/1963 | Macks et al | 274/39 R |
| 2,980,429 | 4/1961 | Thevenaz | 274/39 R |

FOREIGN PATENTS OR APPLICATIONS

| | | | |
|---|---|---|---|
| 867,567 | 5/1961 | Great Britain | 274/39 R |

*Primary Examiner*—Louis R. Prince
*Assistant Examiner*—Charles E. Phillips
*Attorney*—Wenderoth, Lind and Ponack

[57] ABSTRACT

A record player having a stationary chassis member and turntable having a turntable shaft. A driving device is coupled to said turntable for rotating said turntable and an air supply device is supported on said chassis member. A stationary turntable supporting member is secured to said chassis member and includes a radial bearing and a thrust bearing supporting said turntable shaft. The radial bearing is a static air bearing having said air supply device coupled thereto. The thrust bearing is a ball thrust bearing for limiting the vertical displacement of said turntable, and is on the bottom of said turntable shaft. Said stationary turntable supporting member is provided with an exhaust port of predetermined size strategically placed at the bottom thereof.

5 Claims, 6 Drawing Figures

INVENTOR
TAKEHIKO SAWADA

BY Wenderoth, Lind & Ponack
ATTORNEYS

INVENTOR
TAKEHIKO SAWADA

BY Wenderoth, Lind & Ponack
ATTORNEYS

INVENTOR
TAKEHIKO SAWADA

BY Wenderoth, Lind & Ponack
ATTORNEY

TURNTABLE SUPPORT FOR A RECORD PLAYER

RELATION TO OTHER APPLICATIONS

This application is a continuation-in-part of applicant's co-pending application Ser. No. 768,830, filed Oct. 18, 1968 now abandoned.

BACKGROUND OF THE INVENTION

1. FIELD OF THE INVENTION

This invention relates to a turntable support for a record player for playing phonograph records. More particularly, the invention relates to a turntable support employing a static air bearing which eliminates the spurious vibration in a conventional turntable support, and also to a device which reduces the vibration emitted from the air supply means to a tolerable level.

2. DESCRIPTION OF THE PRIOR ART

In modern high quality record players, it is necessary that the mechanical vibration of the moving asemblies be reduced to a minimum and, at the same time, the transmission of the mechanical vibration of moving assemblies to a pick-up needle also be reduced to a minimum so that the pick-up needle does not reproduce such spurious vibrations. To satisfy the requirement, various attempts have been made, such as employing a special electric motor, which is carefully constructed to rotate quietly, or employing a driving belt made of special materials which absorb such spurious vibration.

However, it is very difficult to eliminate vibrations from a turntable support. On the contact surfaces, both of the turntable shaft and of the bearing, there exist a number of microscopic grooves, and even if these contact surfaces are finished as smoothly as possible, these microscopic grooves rub against each other and produce unwanted mechanical vibration when the turntable shaft rotates relative to the bearing.

One solution for eliminating such vibrations in the turntable support is disclosed in U.S. Pat. No. 3,103,364 to E.F. Macks et al. in which an air film is utilized in between the rotating and stationary parts of the turntable support. However, while this prior art is directed to improving the turntable support of a record player by supporting the rotating parts on an air film, it does not teach how the vibration generated by an air supply means can be reduced to a minimum.

There are two types of air bearings, dynamic air bearings and static air bearings. In dynamic air bearings having a moving part which moves rapidly relative to the stationary parts, air frictionally engages the surfaces of both a moving part and stationary parts and forms lubricating air film in the gap between the moving part and the stationary parts.

Therefore, dynamic air bearings need no air supply means. But it is necessary in a dynamic air bearing that the speed of the moving part relative to the stationary part be high, and that the surfaces of both the moving part and the stationary part be finished with ultra precision.

This is not practical foe employing a dynamic air bearing for a turntable support of a record player.

A static air bearing in which lubricating air is fed from an air supply means is practical for use in a turntable support, because the static air bearing does not require such high speed or such ultra finish as in the case of dynamic air bearing. However, the air supply means needs a power source and, in a case of home use record player, the reduction of the power requirement for the air supply means is necessary according to the following reason.

In a home use record player, the air supply means and the turntable support should be constructed in one body, otherwise the handling and operation of the record player becomes troublesome. In such a case, the vibration emitted from the air supply means should be reduced to a minimum to avoid the unwanted noise reproduction picked-up by the pick up needle and, in order to reduce the vibration emitted from the air supply means, the reduction of the power requirement for the air supply means is inevitable.

SUMMARY OF THE INVENTION

Therefore, it is an object of this invention to provide an air bearing for use in a turntable support of a record player having an excellent signal to noise ratio (S/N).

It is another object of this invention to provide a turntable support employing, as a radial bearing, a static air bearing which requires a small amount of air.

Still another object of this invention is to provide a turntable support employing as a radial bearing a static air bearing which provides for stable vertical position of the turntable.

Yet another object of this invention is to provide a device which effectively prevents transmission of vibration from an air supply means to a pick-up needle.

Still another object of this invention is to provide an effective sound-proof means for shutting off the undesirable sound emitted from the air supply means into the space around it.

The phonograph record player according to this invention comprises a chassis, a turntable having a turntable table shaft, a driving means for rotating said turntable, and a turntable supporting means which is secured to said chassis and which includes a radial bearing and a thrust bearing. The radial bearing is a static air bearing which limits the radial displacement of said turntable shaft and has an air film formed by using air supplied from an air supply means to the gap between the outer surface of said turntable shaft and the inner wall thereof. The thrust bearing is a ball thrust bearing which limits the vertical displacement of said turntable, and includes a ball, a smooth plane surface supporting said ball and the bottom surface of said turntable shaft.

Said turntable supporting means has strategically located at the bottom thereof an exhaust port of predetermined size communicating with the ambient atmosphere to thereby advantageously preclude build-up of potential air pressure within a lower chamber which is formed at the bottom of said turntable supporting means.

BRIEF DESCRIPTION OF THE DRAWINGS

The invention will be set forth in detail in the following description taken together with the accompanying drawings, wherein.

DESCRIPTION OF THE PREFERRED EMBODIMENT

Figure 1:
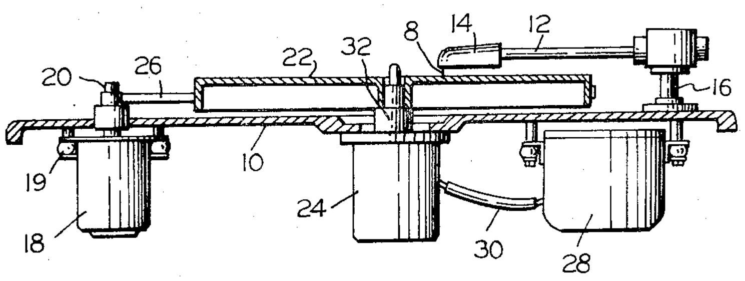
FIG. 1 is an elevational view partly in section of a record player according to this invention.
Figures 2, 3:
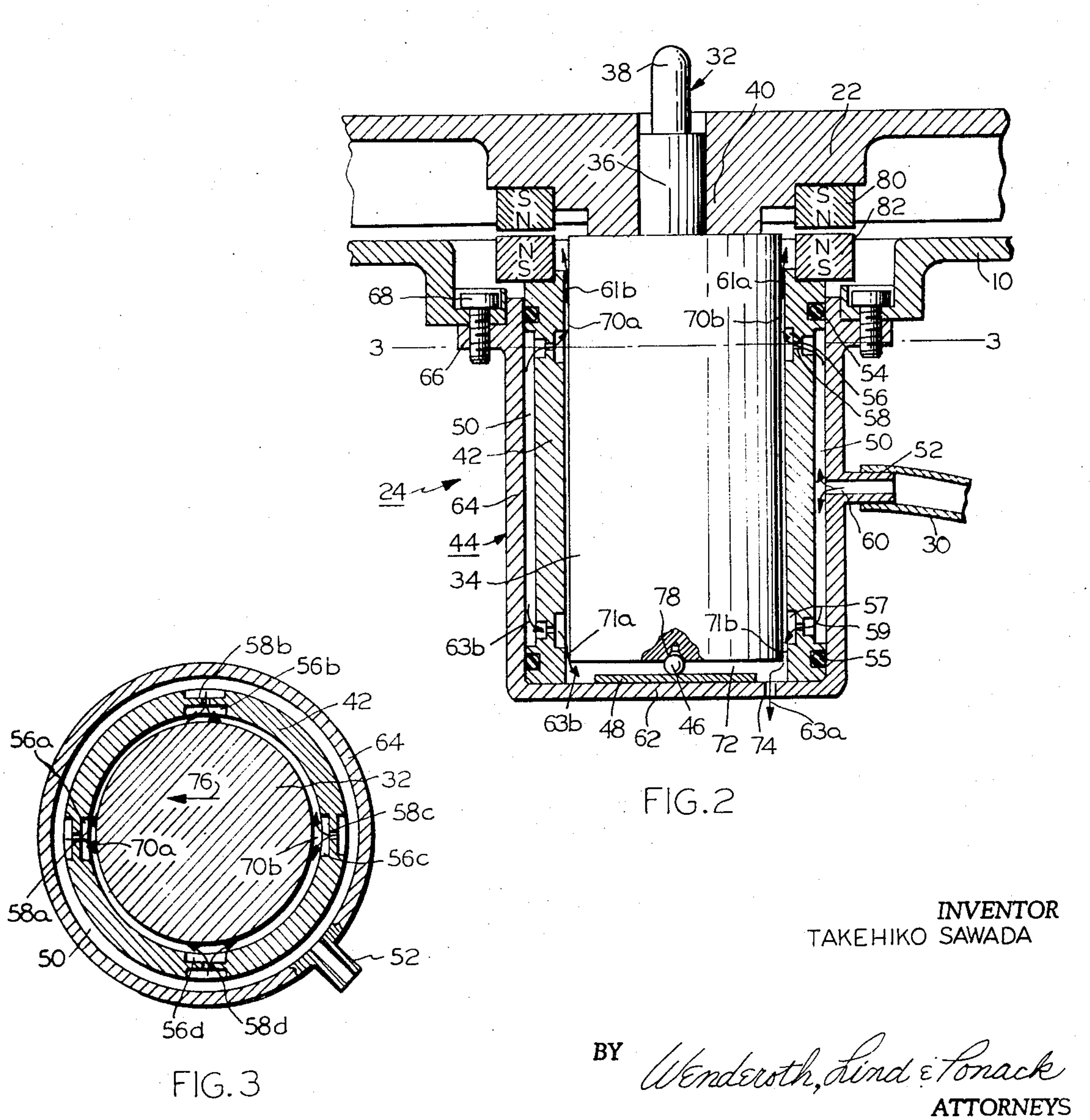
FIG. 2 is a sectional side view of a turntable support according to this invention.
FIG. 3 is a sectional plan view of the turntable support taken along a line 3—3 of FIG. 2.
Figure 5:
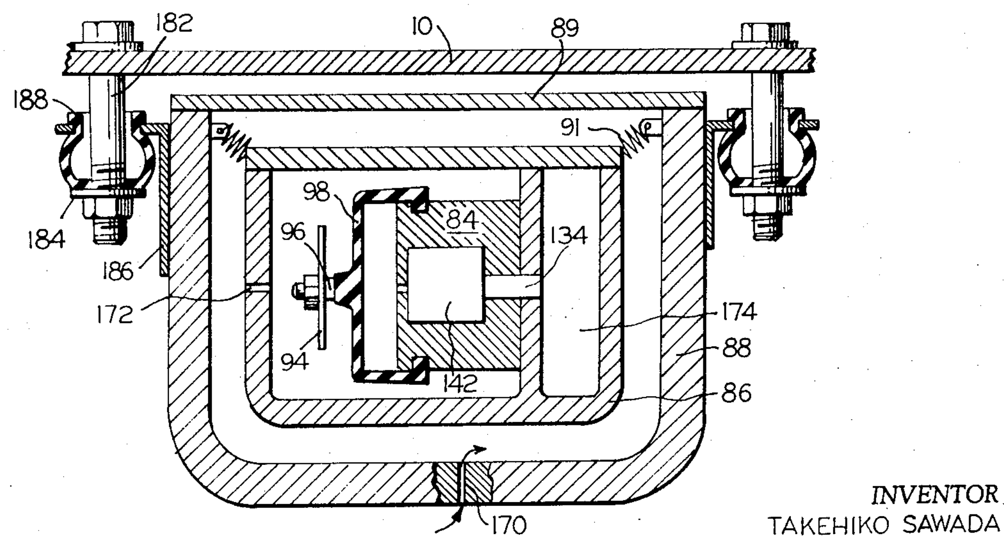
FIG. 5 is a sectional side view of the air supply means taken along a line 5—5 of FIG. 4.

Referring now to the drawings, in FIGS. 1, 2 and 5, a chassis is designated generally by the reference numeral 10.

As seen in FIG. 1, a tone arm 12 is provided at one end of the chassis and has thereon a pick-up 14 having a pick-up needle 8. Tone arm 12 is pivotally mounted on a tone arm support 16 which is mounted on the top side of said chassis 10. A turntable 22 provided with a turntable shaft 32 is rotatably mounted on a turntable support 24 which is secured to the underside of said chassis 10.

A quiet-operating electric motor 18 has a driving pulley 20 attached to the motor shaft thereof, and is mounted on the bottom of said chassis 10 on rubber dampers 19. A driving belt 26 made of resilient material, such as rubber, passes around said turntable 22 and said driving pulley 20 and transmits the power of said electric motor 18 to said turntable 22. Said motor 18 and driving pulley 20 constitute a driving means for rotating said turntable 22. Said chassis 10 also has mounted on the bottom thereof an air supply means 28 which supplies compressed air to said turntable support 24 through an air supply tube 30.

FIGS. 2 and 3 show the detailed construction of the turntable support according to this invention.

Said turntable support 24 comprises a radial bearing and a thrust bearing which are mounted in a bearing housing 44 having a bottom portion 62, a wall portion 64 and a flange portion 66. Said bearing housing 44 is secured to said chassis 10 by means of several bolts 68 extending through said flange portion 66. Said wall portion 64 is generally cylindrical and has an air supply conduit 52 opening through it.

The radial bearing comprises sleeve 42 having a cylindrical shape and positioned within the wall portion 64 of the bearing housing 44. The inner surface of said sleeve 42 is preferably smoothly finished.

Said sleeve 42 and wall portion 64 are spaced to form an annular chamber 50 into which compressed air is supplied through the air supply tube 30 and the air supply conduit 52 in the direction of the arrow 60 in FIG. 2. At both ends of the sleeve 42 the gap between said sleeve 42 and said wall portion 64 is sealed by sealing means 54 and 55 such as rubber O-rings, so that the compressed air does not leak around the ends of sleeve 42. At the upper portion of the inner surface of said sleeve 42, there is formed an annular row of upper pockets **56*a*, 56*b*, 56*c* and 56*d*, which communicate with said annular chamber 50 through upper orifices 58*a*, 58*b*, 58*c* and 58*d*, respectively. Similarly, at the lower portion of the inner surface of said sleeve 42, there is formed an annular row of lower pockets 57 which communicate with said annular chamber 50 through lower orifices 59**.

Said turntable shaft 32 has a lower portion 34 having a large diameter, an intermediate portion 36 having an intermediate diameter, and an uppor portion 38 having a relatively small diameter. Said intermediate portion 36 is positioned in a hole in the central boss 40 of turntable 22 so that the turntable rotates with the turntable shaft 32, and said upper portion 38 projects upwardly so as to position a record to be played.

Said lower portion 34 is positioned in said sleeve 42 which prevents radial movement thereof. It is preferable that the outer surface of said lower portion 32 be smoothly finished as is the inner surface of the sleeve 42, although it does not require the degree of ultra smoothness for use in a dynamic air bearing.

The outer surface of said lower portion 34 and the inner surface of said sleeve 42 are spaced from each other to leave clearances, that is, an upper clearance **70*a*, 70*b* and a lower clearance 71*a*, 71*b*. The compressed air supplied to said annular chamber 50 flows along two paths; one path is in the direction of the arrows 61*a* and 61*b*, from the upper orifices 58 through the upper pockets 56 and through the upper clearance 70*a*, 70*b*, and the other is in the direction of the arrows 63*a* and 63*b*, from the lower orifices 59 through the lower pockets 57 and the lower clearance 71*a* 71*b* to the exhaust port 74**.

The radial bearing described above operates as follows. When the center of the turntable shaft 32 is shifted in the direction of arrow 76 (FIG. 3) by the radial load in the same direction, the left upper clearance **70*a* is reduced and the right upper clearance 70*b* is enlarged. The reduction of said left clearance 70*a* causes an increase of resistance to air flow with the result that the pressure $P_1$ in said left clearance increases. On the contrary, the enlargement of said right clearance 70*b* results in a decrease of the pressure $P_2$ in said right clearance 70*b*. The pressure difference between $P_1$ and $P_2$ causes the center of the turntable shaft 32 to shift in the opposite direction to arrow 76 so that the turnable shaft 32** is restored to its central position. In this way, the air film formed in said clearance maintains the center of the turntable shaft out of direct contact with the inner surface of the bearing.

When the radial load increases further, the turntable shaft begins to contact the inner surface of the bearing directly. The amount of the radial load at the time when the turntable shaft begins such contact is the loading capacity of the turntable support.

The thrust bearing is composed of a thrust plate 48 and thrust ball 46. As shown in FIG. 2, in the bottom surface of the turntable shaft 32, there is formed a small central recess 78 which is located on the axis of rotation of the turntable shaft 32. A small steel thrust ball 46 having a hardened surface is positioned in said recess 78. Said turntable shaft 32 rests on said thrust ball 42 which rests on a thrust plate 48.

Said thrust plate 48 has a very smooth surface and is mounted on the bottom portion 62 of the bearing housing 44. In this way, the thrust load due to the weight of both the turntable 22 and the turntable shaft 32 is supported by the ball thrust bearing in the way described above.

There are two principal advantages of the turntable support according to this invention which is a combination of a radial static air bearing and of a ball thrust bearing.

1. In a conventional turntable support in which the rotating parts directly contact the stationary parts, the level of vibration is proportional to the speed of the rotating parts relative to the stationary parts and to the load on the turntable support. According to this invention, the periphery of the lower portion 34 of the turnable shaft and the inner surface of the sleeve 42 are separated from each other by an air film so that essentially no vibration occurs therebetween. The direct contact between the thrust ball 46 and the thrust plate 48 is substantially a point contact where the relative speed of said thrust ball 46 relative to said thrust plate 48 is nearly zero, so that the vibration caused by relative movement thereof is negligible. Consequently, the vibration noise caused by the turntable support is almost eliminated in accordance with this invention.

2. The radial load on the turntable shaft depends mainly on the tension of the driving belt 26 which is on the order of 50 to 150 grams. But the thrust load of the turntable shaft is on the order of 1,000 to 1,500 grams. Therefore, it is necessary to supply highly compressed air to the static air bearing when the thrust load of the turntable shaft is supported by a static air bearing as in the turntable mechanism of Macks et al. This means that the output power of the air supply must be increased so greatly that the installation of the air supply means upon the chassis of the record player becomes difficult. Air is not necessary to support the thrust load in accordance with this invention. This means a reduction of the output power necessary for the air supply means. The output power can be succesfully reduced to 1.5 watts by employing a turntable support as described above. Such a small power requirement of 1.5 watts makes it possible to install the air supply means on the chassis of the record player, and a home use record playing having an air bearing and an air supply means becomes practical. Yet the emitted vibration from the air supply means of 1.5 watts tends to increase the noise level picked-up by the pick-up needle so that a signal to noise ratio (S/N) of the record player remains 20 dB.

Here, the *S/N* is defined in dB by the following equation:

$$S/N=20 \log_{10} V_M/V_U$$

wherein $V_M$ is the output voltage from the modulated groove of the phonograph record of 1 KHz of recording frequency and 5 cm/sec of speed amplitude of the pick-up needle, and $V_U$ is the output voltage from the unmodulated groove.

An important facet therefore of the invention resides in recognizing the existence of the undesirable and adverse effect of air pressure differentials, which applicant has done, and the solving thereof by the particular construction and air bleed vent location to effect the most favorable reduction of the air pressure differentials with attendant significant reduction in operating power, described in detail herein.

According to this invention, an exhaust port 74 is particularly provided in the bottom portion 62 of the bearing housing 44. When there is no exhaust port at the bottom of the bearing housing 44, the air delivered from the lower port 59 flows into a lower chamber 72 which is formed between the bottom surface of the turntable shaft 32 and the bottom portion 62 of the bearing housing 44. Consequently, the air pressure in said lower chamber 72 increases. This increase of air pressure in the lower chamber 72 results in a reduction of the loading capacity of the turntable support for the following reason. If, for instance, the left clearance 71a near the bottom portion of the turntable shaft 32 is enlarged by a radial load, the air flows into the left clearance **71*a* from the lower chamber 72 so that the air pressure in the left clearance 71**a does not decrease rapidly. Therefore, the pressure difference between the left clearance and the right clearance does not increase rapidly. This means a reduction of the loading capacity of the turntable support. To prevent this reduction of the loading capacity, it is necessary to employ an air supply means having a higher output power.

According to this invention, the exhaust port 74 is therefore provided in the bottom portion 62 of the bearing housing 44 so that the air pressure in the lower chamber 72 is reduced nearly to the ambient atmospheric pressure. Therefore, the pressure in the enlarged clearance decreases rapidly so that the pressure difference between the reduced clearance and the enlarged clearance increases rapidly, and thus the loading capacity of the turntable support increases.

Accordingly, the output power necessary for the air supply means can be kept low, even when a large loading capacity is required. The provision of an unobstructed exhaust port of predetermined size particularly disposed in the bottom portion of the bearing housing permits reducing the output power from 1.5 watts to 0.5 watts, which makes installation of an air supply means on the chassis of the record player very easy.

The reduction in operating power from 1.5 watts to 0.5 watts results in a reduction of the noise level, that is, the S/N is remarkably improved from 20 dB to 42 dB.

Figure 6:
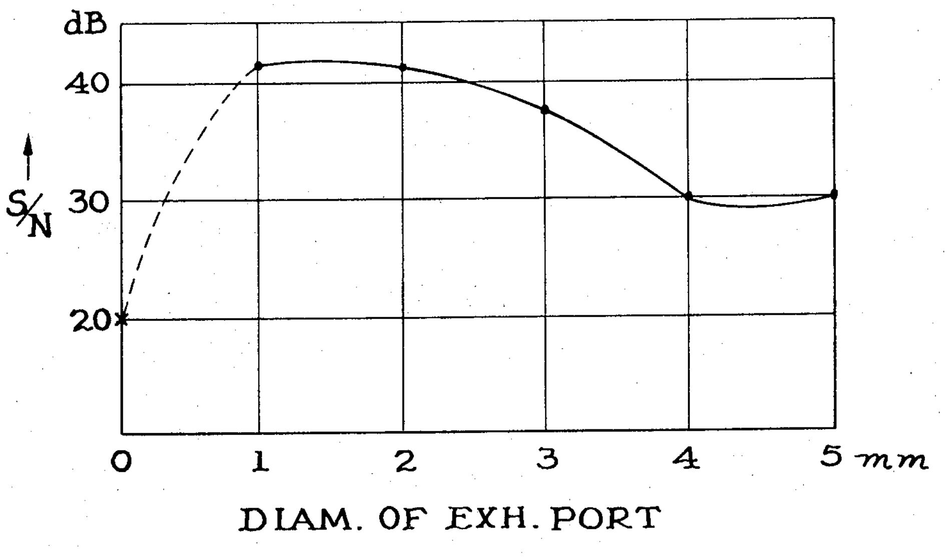
FIG. 6 shows a relationship between S/N and the diameter of the exhaust port.

FIG. 6 shows an example of the pertinent relationship between S/N and a diameter of the exhaust port according to an embodiment shown in FIG. 2 in which a diameter of the lower portion 34 of turntable shaft 32 is 40 mm; a length of the lower portion 34 is 72 mm; the clearances **70*a*, 70*b*, 71*a* and 71*b* are 0.05 mm, respectively; the diameters of orifices 58 and 59 are 0.25 mm, respectively; and the air pressure at the air supply conduit 52** is 45 mmHg.

When there is no exhaust port, that is, the diameter of the exhaust port is zero, the S/N is 20 dB, as mentioned above. The S/N is remarkably improved from 20 dB to 42 dB by employing a predetermined size exhaust port having the diameter ranging from 1 mm to 3mm with an accompanying effect of power reduction of the air supply means. But when the diameter exceeds 3 mm, the S/N drops down again from 42 dB to 32 dB. This S/N drop comes from the direct contact of the turntable shaft 32 with the inner surface of the sleeve 42 by the decrease of the air pressure at the clearances **70*a*, 70*b*, 71*a* and 71*b*.** Therefore, the preferable diameter of the exhaust port is the diameter ranging from 1 mm and 3 mm according to the present embodiment. As a matter of fact, the preferable diameter of the exhaust port will change to some degree depending upon the dimensions of the embodiment of the turntable support.

Accordingly, it is important to determine the diameter of the exhaust port such that the air pressure in the lower chamber 71 is reduced nearly to the ambient atmospheric pressure, but still slightly higher than the ambient atmospheric pressure so as to maintain enough air pressure at the clearances **70*a*, 70*b*, 71*a* and 71*b*.** The preferable air pressure at the lower chamber lies in range between 5 mmHg and 20 mmHg higher than the ambient atmospheric pressure when the supply air pressure is 45 mmHg.

The preferable pressure ratio of the pressure in the lower chamber to the pressure in the supply conduit lies between 0.1 and 0.5.

The provision of the exhaust port, particularly or strategically, at the bottom portion of the bearing housing has another advantage.

When there is no exhaust port, the turntable shaft tends to move up and down in response to the variation of the air pressure at the lower chamber 72 so that the vertical position of the turntable shaft is unstable. However, with the provision of an exhaust port 74 at the bottom portion 62 of the bearing housing 44, the air pressure in the lower chamber 72 is reduced nearly to the ambient atmospheric pressure. Accordingly, the turntable shaft rests stably on the thrust ball 46 resting on the thrust plate 48 so that the vertical position of the turntable shaft is stable.

As shown in FIG. 2, ring shaped permanent magnets 80 and 82, made of, for example, barium ferrite, are fixed to the central boss 40 and the top portion of the sleeve 42, respectively, and are magnetized, as shown in FIG. 2, in such a way that the magnets 80 and 82 repel each other. Therefore, the thrust load upon the thrust ball 46 is reduced by this repelling force so that the vibration caused by the direct contact between the thrust ball 46 and the thrust plate 48 is decreased further, and the thrust ball 46 and the thrust plate 48 will have a long life.

Figure 4:
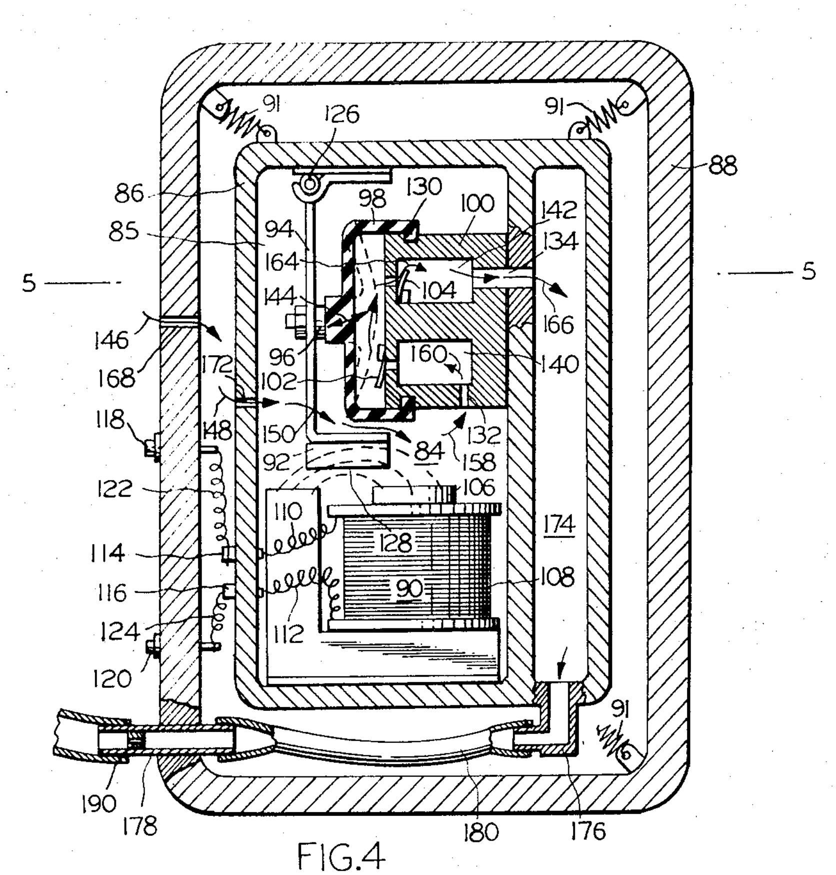
FIG. 4 is a sectional plan view of an air supply means according to this invention.

As shown in FIGS. 4 and 5, air supply means 28 comprises an air pump casing 86 which has two air-tight sealed cavities 85 and 174, and a connecting hole 134 extending between said cavities 85 and 174.

An air pump 84 is positioned in one of said cavities, the cavity 85, and compressed air is delivered directly from the air pump into the cavity 174, which acts as an air reservoir. Said air pump casing 86 is suspended in the interior of an air pump housing 88 by several coil springs 91. The air pump housing 88 is covered by an air-tight cover plate 89 so that the interior space is sealed air-tight. The air pump casing 86 has a hole 172 therein, and the air pump housing 88 has several holes 168 and 170 therein, respectively, so that air can flow into casing 86 through said several holes.

The air pump 84 comprises an electric magnet 90, an L-chaped lever 94 having a permanent magnet 92 secured at one end thereof, a piston 98, and a pump block 100. An electric magnet 90 having a laminated core 106 and a field core 108 is secured to the inside of the wall of the air pump casing 86. Said field coil 108 is connected to the leads 110 and 112 through which an alternating electric current is supplied.

Said leads 110 and 112 terminate at the intermediate terminals 114 and 116, respectively. Said terminals 114 and 116, which are insulated from each other, are fixed to and extend through a side wall of the air pump casing 86. Said intermediate terminals 114 and 116 are further connected by the leads 122 and 124 to terminals 118 and 120 which are insulated from each other and extend through a wall of the air pump housing 88 fixed to said wall. Said terminals 118 and 120 are further connected to a suitable source of alternating electric current. The L-shaped lever 94 having the permanent magnet 92 at one end thereof is pivotally mounted on the inside of the wall of the air pump casing 86 by a pivot 126 When an alternating electric current is supplied to thefield coil 108, an alternating magnetic field is generated, as shown by the dotted lines 128 in FIG. 4.

The interaction between said alternating magnetic field and the permanent magnet 92 causes the L-shaped lever 94 to vibrate about the pivot 126. This vibration is transferred to the piston 98 by a connecting rod 96.

The piston 98, which is in a cup-shaped form and is made of resilient material, such as rubber, is secured by a flange portion 130 thereof to the pump block 100, which is fixed on the inside of the wall of the air pump casing 86. Said pump block 100 has an inlet hole 132, a delivery hole 134, a suction valve 102, a delivery valve 104, a suction cavity 140, and a delivery cavity 142.

When the piston 98 vibrates in the direction of the arrow 144, the air flows in the direction of arrows 158, 160, 162, 164 and 166, and is exhausted as compressed air directly into the air reservoir 174 through the delivery hole 134. Air to be compressed is drawn from the ambient atmosphere through the holes 168 and 170 in the wall of the air pump housing 88 and through the supply hole 172 in the wall of the air pump casing 86 and flows in the direction of arrows 146, 148 and 150. It has been discovered according to this invention that the leakage of the sound produced by the motion of said air pump 84 to the ambient atmosphere is prevented by limiting the cross-sectional area of each of said plurality of holes 168, 170 and 172 to no more than 2 $mm^2$.

A delivery conduit 176 is provided in the wall of said air reserviou 174 and an exhaust conduit 178 is provided ithe wall of the air pump housing 88.

The delivery conduit 176 and exhaust conduit 178 are connected by a connecting tube 180. The exhaust conduit 178 is further connected to the air supply conduit 52 of the bearing housing 44 by means of the air supply tube 30. Therefore, compressed air flows from the delivery conduit 176 through the connecting tube 180, the exhaust conduit 178 and the air supply tube 30 to the air supply conduit 52.

This invention provides a means for preventing a transmission of the vibration of the air supply means. As previously mentioned, the air pump casing 86 is suspended in the interior of the air pump housing 88 by means of coil springs 91. It is important that the mass of the suspended air pump casing 86 and the spring constant of said coil spring 91 be determined in such a way that the natural period of vibration of the suspended air pump casing 86 is at a frequency lower than the audio frequency range, preferably lower than 5 to 10 Hz. Support bolts 182 provided with support washers 184 are fixed to the chassis 10. The bent tabs 186 are fixed to the walls of the air pump housing. Said bent tabs 186 are provided, respectively, with damping rubber cushions 188 which are mounted on said support washers 184. It is also important that the mass of the air pump and the spring constant of the damping rubber cushions 188 be determined in such a way that the natural period of vibration of the air pump housing 88 is at a frequency lower than the audio frequency range, preferably lower than 10 to 15 Hz.

Thus, the system comprising the coil springs 91, the air pump housing 88, and the damping rubber cushions 188, serves as a mechanical filter preventing the transmission of vibration noise produced by the air pump 84 to the chassis 10.

According to this invention, the connecting tube 180 and the air supply tube 30 are made of a pliant material. Preferred materials are natural rubber, synthetic rubber, polyurethane, soft grade polyvinylchloride, ethylenevinylacetate-copolymer, inomer, or high pressure method polyethylene.

With these preferred materials, the vibration level on the turntable is reduced to a level of 20 dB, which is lower than that when rigid materials such as hard grade polyvinylchloride, low pressure method polyethylene, or heat curing resins are used.

The compressed air exhausts from the air pump 84 in pulses, due to the reciprocal movement of piston 98, which pulses increase the spurious vibrations on the turntable. This invention provides a device which absorbs said pulses.

It is widely known that an air reservoir having a large cavity is effective to absorb such pulses, while the necessity for such an air reservoir makes it more difficult to build a compact record player, whether of the compact console or portable type. Therefore, this invention provides a throttle orifice 190 positioned in the air path as means for absorbing pulses.

A throttle orifice adjacent to the delivery hole of the air pump normally increases the variation of the loading pressure of the air pump so that the efficiency of the air pump decreases.

In this invention, however, a small air reservoir 174 having a volume of between 30 and 40 $cm^3$ is provided at the end of the delivery hole 134 from the air pump 84, and the throttle orifice 190 having a circular hole of 1 mm diameter is located in the air path downstream of said air reservoir 174.

Consequently, the inevitable pulsation of the compressed air caused by the air pump is successfully prevented from reaching the turntable by employing the combination of the air reservoir and the orifice without impairment of the compactness of the record player and the efficiency of the air pump.

It is apparent that various modifications can be made without departing from the spirit or scope of the present invention. The above described examples are intended merely to illustrate some of the important facets in certain selected embodiments of the present invention, and it is to be understood that the scope of the present invention is limited only by the following claims.

What is claimed is:

1. In a record player comprising a stationary chassis member, a turntable having a turntable shaft with a lower end surface, a stationary turntable supporting member which is secured to said chassis member, a driving means and means coupling said driving means to said turntable for rotating said turntable, the improvement comprising a pressurized air supply means and an improved combined radial air bearing and axial thrust ball bearing means for supporting said turntalbe shaft, said air supply means and said combined bearing means being supported on said chassis member to provide a more compact unit, said radial bearing means comprising said turntable supporting member having a bearing housing therein and a concentric bearing sleeve means located in said bearing housing, said sleeve means surrounding said turntable shaft and defining a clearance between the outer surface of said turntable shaft and an inner wall surface of said bearing sleeve, apertures formed in said sleeve means for introducing a film of pressurized air to said clearance from said air supply means for limiting the radial displacement of said turntable shaft, said axial thrust bearing limiting the vertical displacement of said turntable and including a bearing plate disposed in said housing and having a smooth plane surface, a ball engaging the bottom surface of said turntable shaft and being supported on said plate, said turntable supporting member and said bottom portion of said turntable shaft defining a lower chamber at the bottom portion thereof, said turntable supporting member having at the bottom thereof an unobstructed exhaust port of predetermined size connecting said lower chamber with the ambient atmosphere to advantageously preclude the build up of potential air pressure within said lower chamber and thereby reducing the operating power requirements.

2. A record player as claimed in claim 1 wherein said air supply means comprises an air pump casing having an air reservoir and an air pump therein, an air pump housing, resilient means suspending said air pump casing in said pump housing, damping means securing said pump housing to said chassis, and a flexible tube connecting said reservoir with said radial air bearing, said resilient means having a spring constant such that the natural period of vibration of said suspended air pump casing is at a frequency lower than the audio frequency range, said air pump housing having a mass such that the natural period of vibration of said air pump housing and said damping means is at a frequency lower than the audio frequency range, said air pump casing and said air pump housing having air supply holes therein and being otherwise air-tight.

3. A record player as closed in claim 2 wherein said air supply means includes means for absorbing pulsation of the compressed air which comprises an air reservoir having a throttle orifice, said air reservoir being attached directly to said air pump case so that the compressed air exhausts directly into said reservoir, and said throttle orifice being positioned in the flow path of the air between said air reservoir and said turntable supporting means.

4. A record player as claimed in claim 1 in which said thrust bearing further comprises a pair of ring shaped mangets, one of which is secured to said rotatable means and the other of which is secured to one of said stationary members, and said pair of magnets being positioned coaxially and having the like poles opposed to each other so as to repel each other.

5. A record player as claimed in claim 1 wherein said exhaust port's predetermined size is such that it makes the air pressure in said lower chamber reduce nearly to the ambient atmospheric pressure, but still slightly higher than the ambient atmosphere so as to maintain the air pressure at said clearance between said turntable shaft and said sleeve.

* * * * *

65